United States Patent
Zhang et al.

(10) Patent No.: US 7,381,081 B2
(45) Date of Patent: Jun. 3, 2008

(54) AUXILIARY MOUNTING APPARATUS FOR EXPANSION CARDS

(75) Inventors: Jun-Xiong Zhang, Shenzhen (CN); Jia-Qi Fu, Shenzhen (CN); Hong-Run Li, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/502,218

(22) Filed: Aug. 10, 2006

(65) Prior Publication Data
US 2007/0042645 A1 Feb. 22, 2007

(30) Foreign Application Priority Data
Aug. 19, 2005 (CN) .................. 2005 2 0063520

(51) Int. Cl.
*H01R 13/68* (2006.01)

(52) U.S. Cl. ...................... 439/377; 439/64

(58) Field of Classification Search ............... 439/377, 439/64, 631, 634, 632, 159, 160; 361/801, 361/759, 685, 683, 740, 686; 174/666
See application file for complete search history.

(56) References Cited

U.S. PATENT DOCUMENTS

| 4,745,524 | A | | 5/1988 | Patton, III |
| 5,757,618 | A | * | 5/1998 | Lee .......................... 361/686 |
| 6,278,614 | B1 | * | 8/2001 | Beaman et al. ............. 361/752 |
| 6,320,752 | B1 | * | 11/2001 | Jang ........................... 361/740 |
| 6,320,760 | B1 | * | 11/2001 | Flamm et al. .............. 361/801 |
| 6,442,038 | B1 | * | 8/2002 | Erickson et al. ............ 361/759 |
| 6,480,393 | B1 | | 11/2002 | Chen |
| 6,487,070 | B2 | | 11/2002 | Gan |

* cited by examiner

*Primary Examiner*—Alexander Gilman
(74) *Attorney, Agent, or Firm*—Morris Manning Martin LLP; Tim Tingkang Xia, Esq.

(57) ABSTRACT

A mounting apparatus for aiding in mounting a plurality of long expansion cards in electrical devices includes a rack, and a fixing member. Each of the expansion cards defines an aperture in one end thereof. The rack includes a supporting shelf, a beam, and a fixing plate. The fixing member is slidably attached to the fixing plate of the rack and includes a plurality of hooks extending therefrom. The hooks movably engage in apertures to secure the expansion cards.

19 Claims, 3 Drawing Sheets

AUXILIARY MOUNTING APPARATUS FOR EXPANSION CARDS

CROSS-REFERENCE TO RELATED APPLICATION

Related subject matter is disclosed in the co-pending U.S. patent application Ser. No. 11/344,433, filed on Jan. 30, 2006, and entitled "MOUNTING APPARATUS FOR EXPANSION CARDS" which is assigned to the same assignee with this patent application.

BACKGROUND OF THE INVENTION

1. Field of the Invention

The present invention relates to mounting apparatuses for mounting a plurality of expansion cards in an electronic device, and particularly to an auxiliary mounting apparatus which can aid to securely mount a plurality of expansion cards with long dimensions in an electronic device.

2. Background of the Invention

In order to upgrade the operating capabilities of a personal computer, a plurality of expansion cards is operatively installed in the computer enclosure. Typical types of expansion cards include network cards, sound cards, graphics accelerator cards, multi-media cards and etc.

U.S. Pat. No. 4,745,524 discloses a mounting mechanism for mounting a plurality of expansion cards in a computer chassis. The mounting mechanism includes a pressing element, and a screw to secure a separate cover piece of a corresponding expansion card. However, the mounting mechanism only secures one end of the expansion cards to the computer chassis. If the expansion cards are long, such a mounting mechanism may not stably secure the expansion cards in the computer chassis.

What is needed is to provide a mounting apparatus which can aid to securely mount long expansion cards in electrical devices.

SUMMARY

In a preferred embodiment, a mounting apparatus for aiding in mounting a plurality of long expansion cards in electrical devices includes a rack, and a fixing member. Each of the expansion cards defines an aperture in one end thereof. The rack includes a supporting shelf, a beam, and a fixing plate. The fixing member is slidably attached to the fixing plate of the rack and includes a plurality of hooks extending therefrom. The hooks movably engage in apertures to secure the expansion cards.

Other advantages and novel features of the invention will become more apparent from the following detailed description when taken in conjunction with the accompanying drawings, in which:

DETAILED DESCRIPTION OF THE EMBODIMENT

Figure 1:
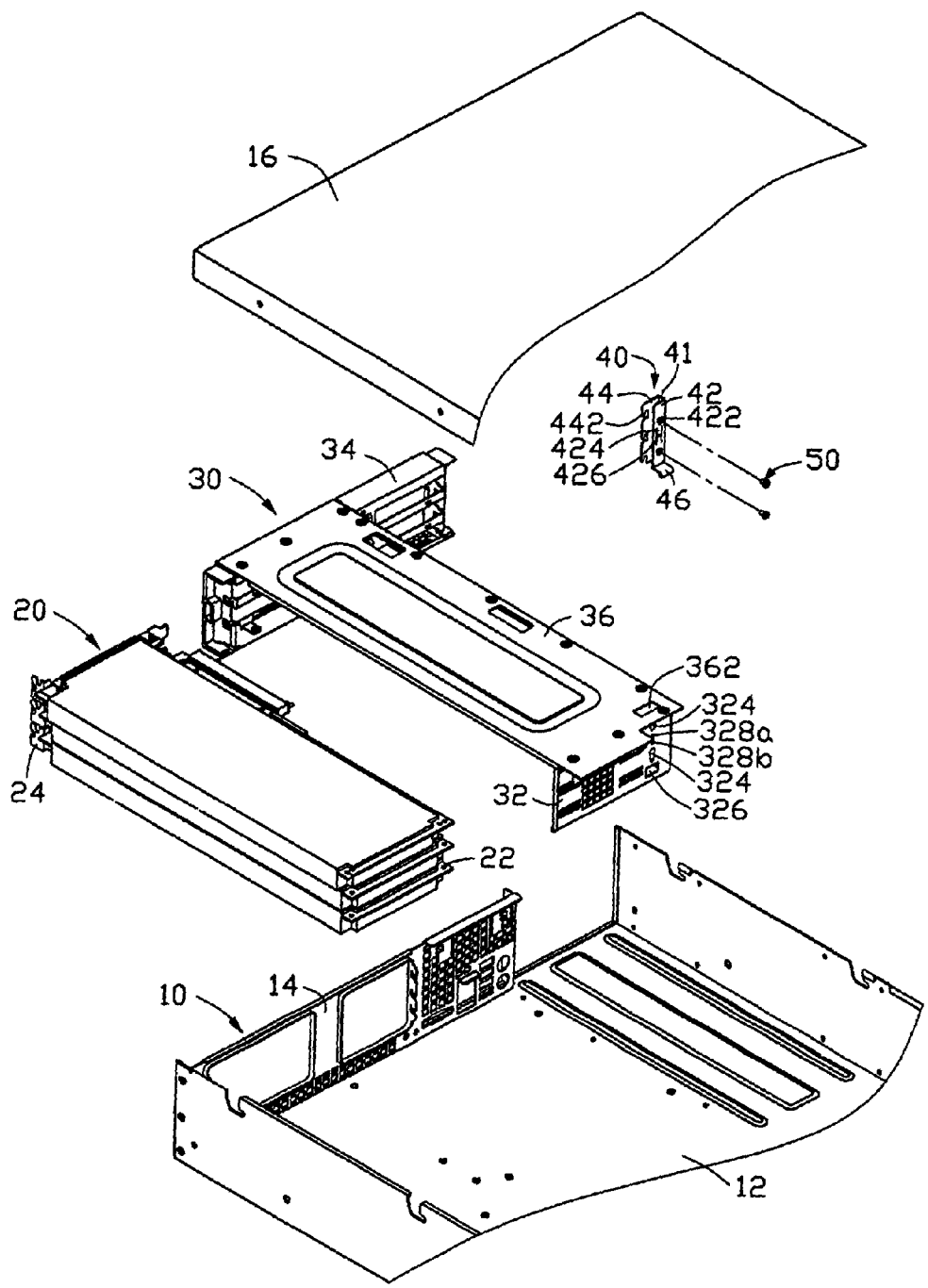
FIG. 1 is an exploded, isometric view of a mounting apparatus in accordance with a preferred embodiment of the present invention, together with a rack and part of a chassis.

Referring to FIG. 1, a mounting apparatus of an electronic device like a computer for securely mounting a plurality of functional parts like expansion cards 20 to the electronic device in accordance with a preferred embodiment of the present invention includes a rack 30, and a fixing member 40. The rack 30 is installed in a chassis 10 of the electronic device for receiving the expansion cards 20 therein. The fixing member 40 is slidably attached to the rack 30.

Each of the expansion cards 20 includes a pair of apertures 22 defined in corners of one end thereof, and a covering piece 24 attached to another end thereof.

The chassis 10 includes a bottom panel 12, a rear panel 14 perpendicular to the bottom panel 12, and a cover panel 16.

Figure 2:
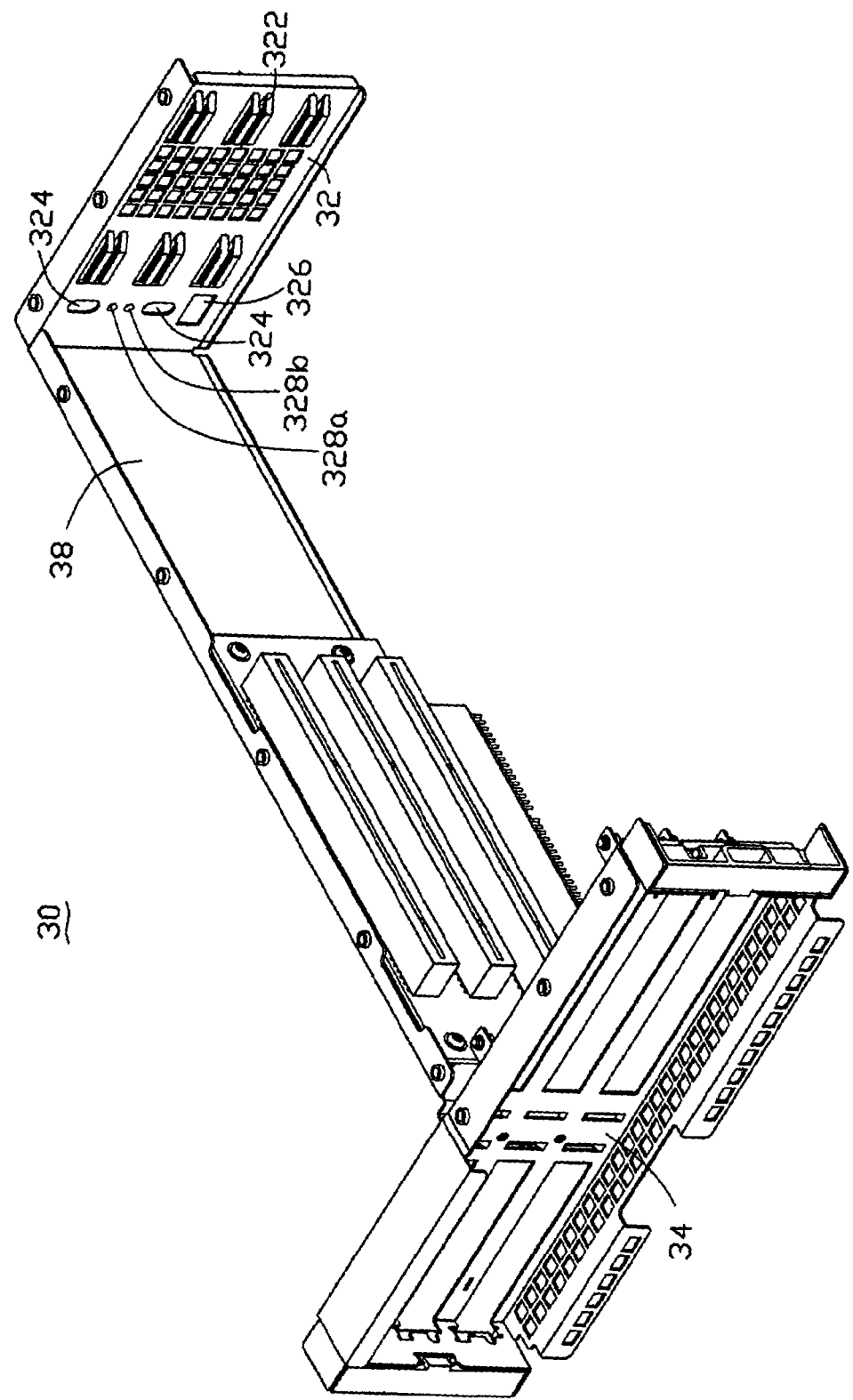
FIG. 2 is an enlarged, isometric view of a part of the rack of FIG. 1, but viewed from another aspect.

Referring to FIG. 2, the rack 30 includes a fixing plate 32 perpendicular to the bottom panel 12 of the chassis 10, a supporting shelf 34 attached to the rear panel 14 of the chassis 10, a beam plate 36 perpendicularly disposed on tops of the fixing plate 32 and the supporting shelf 34, and an adapting board 38 perpendicularly connected between the fixing plate 32 and the supporting shelf 34. The supporting shelf 34 is for retaining the covering pieces 24 of the expansion cards 20 thereon. The fixing plate 32 includes plural sets of guiding rails 322 extending from an inner surface thereof, for guiding and supporting the expansion cards 20. A pair of slots 324 is defined in the fixing plate 32 beside the guiding rails 322. An opening 326 is defined in the fixing plate 32 below the slots 324. Two protrusions 328a, 328b extend inwardly from the inner surface of the fixing plate 32 between the slots 324, one below another. A through hole 362 is defined in the beam plate 36, corresponding to the slots 324 of the fixing plate 32.

The fixing member 40 includes a main body 41, a first flange 42, and a second flange 44. The first flange 42 and the second flange 44 separately and perpendicularly extend from two opposite side edges of the main body 41. A pair of posts 422 extends perpendicularly from the first flange 42, for sliding in the slots 324 of the rack 30. A resilient tab 424 with a projection 426 extends from the first flange 42, to engage with the protrusions 328a and 328b of the rack 30. A handle 46 extends from a bottom end of the first flange 42. A plurality of hooks 442 is formed at an outer edge of the second flange 44, corresponding to the apertures 22 of the expansion cards 20.

Figure 3:
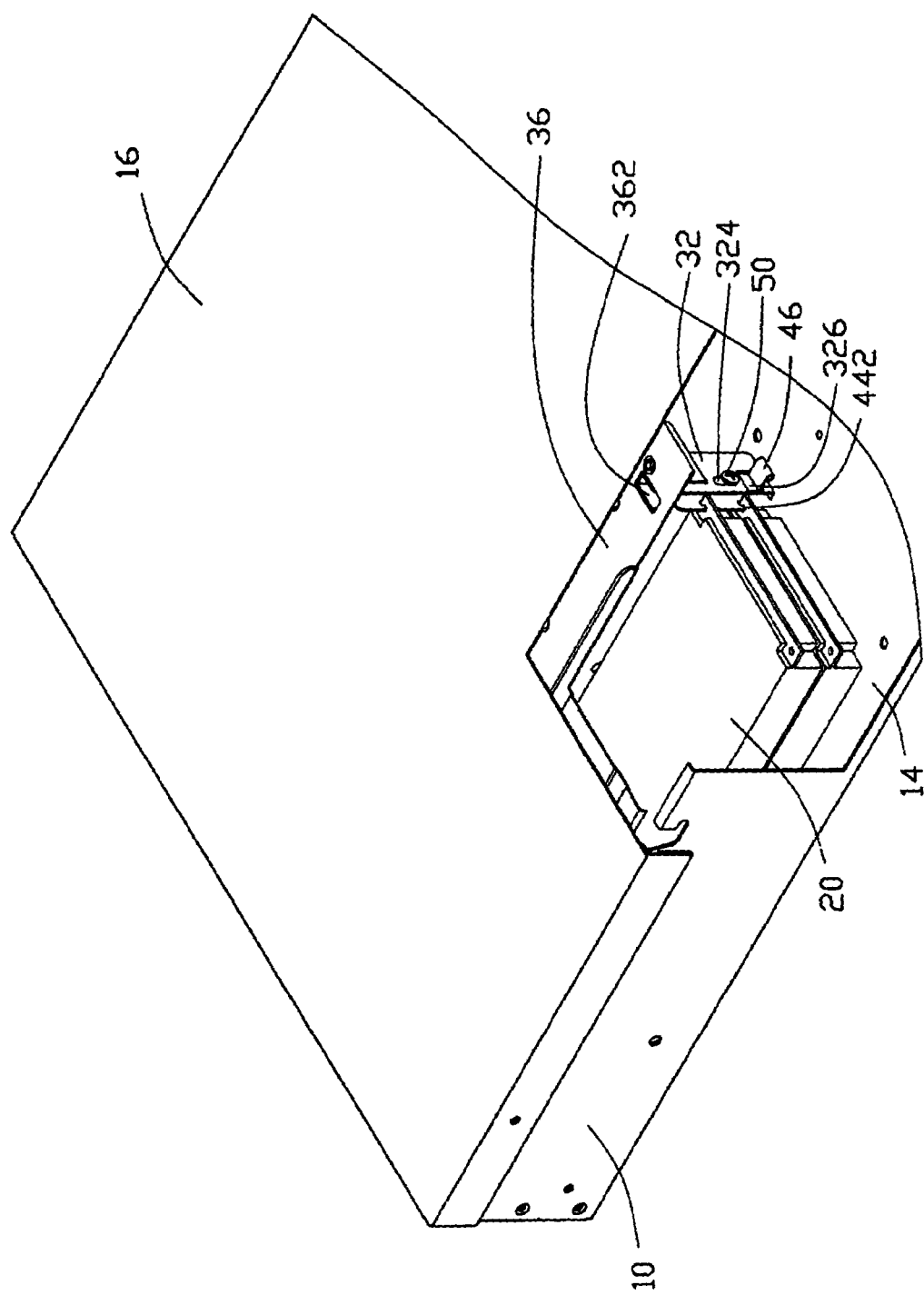
FIG. 3 is a cut away assembled view of FIG. 1.

Referring also to FIG. 3, in assembly, the fixing member 40 is slidably attached to the inner surface of the fixing plate 32 of the rack 30. The posts 422 slidably extend through the slots 324. A pair of fasteners 50 securely attached to distal ends of the posts 424. The handle 46 extends out of the rack 30 via the opening 326.

The expansion cards 20 are inserted into the rack 30, sliding along the guiding rails 322 of the rack 30. The fixing member 40 is moved along the fixing plate 32 by moving the handle 46 up, with the posts 422 sliding in the slots 324. The projector 426 of the resilient tab 424 abuts against the protrusion 328a to locate the fixing member 40 in an unlocked position. Then the fixing member 40 is moved downward along the fixing plate 32 so that the hooks 442 of the fixing member 40 engage in the apertures 22 of the expansion cards 20. The projector 426 of the resilient tab 424 abuts against the protrusion 328b to locate the fixing member 40 in a locked position. The covering pieces 24 of the expansion cards 20 are retained on the supporting shelf 34 by any suitable conventional fixing apparatus. Thus, the expansion cards 20 are securely attached in the rack 30.

The assembled rack 30 and expansion cards 20 are installed in the chassis 10. The supporting shelf 34 is attached to the rear panel 14 of the chassis 10, and the fixing plate 32 is attached to the bottom panel 12 of the chassis 10. Finally, the cover panel 16 is attached on the chassis 10 and rests on beam plate 36 and a top of the fixing member 40 to further secure the expansion cards 20.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

We claim:

1. An auxiliary mounting apparatus for expansion cards, each of the expansion cards defining an aperture in one end thereof opposite to an end with a covering piece, the auxiliary mounting apparatus comprising:
   a rack defining a space for receiving expansion cards therein and comprising a shelf securing the covering pieces of the expansion cards thereon, and a fixing plate parallel to the shelf; and
   a fixing member attached to the fixing plate and comprising a plurality of hooks, the fixing member slidable perpendicular to the expansion cards so that the hooks engage in the apertures of the expansion cards.

2. The auxiliary mounting apparatus as claimed in claim 1, wherein the fixing plate of the rack further comprises plural sets of guiding rails extending therefrom to support and guide the expansion cards.

3. The auxiliary mounting apparatus as claimed in claim 1, wherein the fixing member comprises a resilient tab extending therefrom, a projection extends from the resilient tab, the fixing plate comprises a pair of protrusions extending therefrom to separately engage with the projection.

4. The auxiliary mounting apparatus as claimed in claim 1, wherein the fixing plate of the rack defines an opening therein, the fixing member comprises a handle extending from an end thereof and through the opening.

5. The mounting apparatus as claimed in claim 1, wherein the rack further comprises a beam plate perpendicularly connecting ends of the shelf and the fixing plate, the beam plate comprises a through hole defined therein, for movably receiving the fixing member therethrough.

6. The mounting apparatus as claimed in claim 1, wherein the fixing member has a U-shaped section, the hooks are formed at one side plate of the fixing member, and the other side plate of the fixing member is attached to the fixing plate.

7. The auxiliary mounting apparatus as claimed in claim 1, wherein the fixing plate of the rack defines a pair of slots therein, the fixing member comprises a pair of posts extending therefrom to slide in the slots.

8. The auxiliary mounting apparatus as claimed in claim 7, wherein fasteners are respectively attached to distal ends of the posts to locate the posts.

9. A mounting apparatus for mounting expansion cards, each of the expansion cards comprising a covering piece at one end thereof, and an aperture in another end thereof, the mounting apparatus comprising:
   a rack comprising a supporting shelf, and a fixing plate parallel to the supporting shelf, the supporting shelf securely receiving the covering pieces of the expansion cards thereon, the fixing plates comprising plural sets of guiding rails to hold the extension cards;
   a fixing member slidably attached to the fixing plate and comprising a plurality of hooks to engage in the apertures of the expansion cards; and
   the rack further comprising a beam plate perpendicularly connecting ends of the supporting shelf and the fixing plate, the beam plate comprising a through hole defined therein for movably receiving the fixing member therethrough.

10. The mounting apparatus as claimed in claim 9, wherein the fixing member comprises a resilient tab extending therefrom, a projection extends from the resilient tab, the fixing plate comprises a pair of protrusions extending therefrom to separately engage with the projection.

11. The mounting apparatus as claimed in claim 9, wherein the fixing plate of the rack defines an opening therein, the fixing member comprises a handle extending from an end thereof and through the opening.

12. The mounting apparatus as claimed in claim 9, wherein the rack further comprises an adapting board perpendicularly arranged between the supporting shelf and the fixing plate.

13. The mounting apparatus as claimed in claim 9, wherein the fixing member has a U-shaped section, the hooks are formed at one side plate of the fixing member, and the other side plate of the fixing member is attached to the fixing plate.

14. The mounting apparatus as claimed in claim 9, wherein the fixing plate of the rack defines a pair of slots therein, the fixing member comprises a pair of posts extending therefrom to slide in the slots.

15. The mounting apparatus as claimed in claim 14, wherein fasteners are attached to distal ends of the posts to locate the posts.

16. An electronic device comprising:
   a chassis enclosing said electronic device comprising a panel extending along a side thereof;
   a plurality of functional parts installable in said chassis beside said panel for functional extension of said electronic device, and a first end thereof partially exposable to an outside of said chassis through said panel of said chassis when each of said plurality of functional parts is securely installed to said panel, said each of said plurality of functional parts defining a second end opposite to said first end extending away from said panel along a first direction perpendicular to said panel; and
   a fixing member installable in said chassis beside said second end of said each of said plurality of substantially flat functional parts, said fixing member movable to engage with said second end of said each of said plurality of functional parts along a second direction perpendicular to said first direction and perpendicular to said each of said plurality of functional parts in order to securely retain said each of said plurality of functional parts in said chassis together with said panel.

17. The electronic device as claimed in claim 16, further comprising a rack installable in said chassis to partially enclose said plurality of installed functional parts in said chassis therein, said rack comprising a fixing plate extending to reachably neighbor said end of said each of said plurality of functional parts for holding said end, and said fixing member movably installed at said fixing plate.

18. The electronic device as claimed in claim 16, further comprising a rack, the rack comprising a supporting shelf to engage with said first ends of said plurality of functional parts, and a fixing plate parallel to said supporting shelf to engage with said second ends of said plurality of functional parts, a beam plate perpendicularly connecting ends of said supporting shelf and said fixing plate, said beam plate comprises a through hole defined therein for movably receiving said fixing member therethrough.

19. The electronic device as claimed in claim 16, wherein said fixing member has a U-shaped section, hooks are formed at one side plate of said fixing member, and the other side plate of said fixing member is attached to said fixing plate.

* * * * *